US008282825B2

(12) United States Patent
Kent

(10) Patent No.: US 8,282,825 B2
(45) Date of Patent: Oct. 9, 2012

(54) CYLINDRICAL INLINE FLUIDS FILTER

(76) Inventor: Greg Kent, Oceanside, CA (US)

( * ) Notice: Subject to any disclaimer, the term of this patent is extended or adjusted under 35 U.S.C. 154(b) by 384 days.

(21) Appl. No.: 12/560,357

(22) Filed: Sep. 15, 2009

(65) Prior Publication Data

US 2011/0031173 A1     Feb. 10, 2011

Related U.S. Application Data

(60) Provisional application No. 61/231,313, filed on Aug. 4, 2009.

(51) Int. Cl.
*B01D 29/00* (2006.01)
*B01D 35/28* (2006.01)
*B01D 27/00* (2006.01)

(52) U.S. Cl. ........ 210/248; 210/337; 210/338; 210/446; 210/448; 210/455; 210/456; 210/457

(58) Field of Classification Search ............... 210/248, 210/130, 337, 338, 446, 448, 455, 456, 457
See application file for complete search history.

(56) References Cited

U.S. PATENT DOCUMENTS 5,106,501 A * 4/1992 Yang et al. ............... 210/266
6,387,261 B1 * 5/2002 Mojena ..................... 210/315

* cited by examiner

*Primary Examiner* — Benjamin Kurtz
(74) *Attorney, Agent, or Firm* — Steven W. Webb

(57) ABSTRACT

A fluids filter is presented that is cylindrical in shape and can be adapted to fit inline with any pipe system. The filter is comprised of an outer solid cylinder and an inner cylinder possessing multiple filter means, including a replaceable fine mesh or material filter. An absorbent boom can be placed in the filter system to absorb hydrocarbons or other materials. The inner tube possesses an emergency bypass in case of flows through the pipe system exceeding rated levels.

1 Claim, 2 Drawing Sheets

CYLINDRICAL INLINE FLUIDS FILTER

RELATED APPLICATIONS

This application claims the benefit of Provisional Application 61/231,313, filed Aug. 4, 2009.

FIELD OF THE INVENTION

This invention relates to the fields of water filtration systems and water control systems.

BACKGROUND OF THE INVENTION

There are many methods for capturing particulate matter suspended in water as it passes through piping or tubing, e.g. drain piping, and drain lines, installed on the inside and outside of buildings and other inhabited structures. To accomplish capture of particulate matter, a filter apparatus is placed at the input end, the output end, or inline with the piping or tubing between its influent and effluent ends.

SUMMARY OF THE INVENTION

The present invention is composed of an inner and outer cylinder. The outer cylinder is a housing for the inner cylinder, which is perforated and may be wrapped with various sized screens and filter materials. The top of the inner cylinder is capped, which forces in-flowing water towards the area between the inner and outer cylinders. Water entering this space is forced through the mesh screens and/or filter material.

As water passes through the mesh screens and/or filter material, particulate matter is captured and stored within the filter in the area between the inner and outer cylinders. The upper part of the inner cylinder contains a plurality of multiple, larger openings which are not filtered to allow for water flows greater than the designed flow rate to flow through the apparatus unimpeded, as a bypass safety measure.

DETAILED SPECIFICATION

Figure 1:
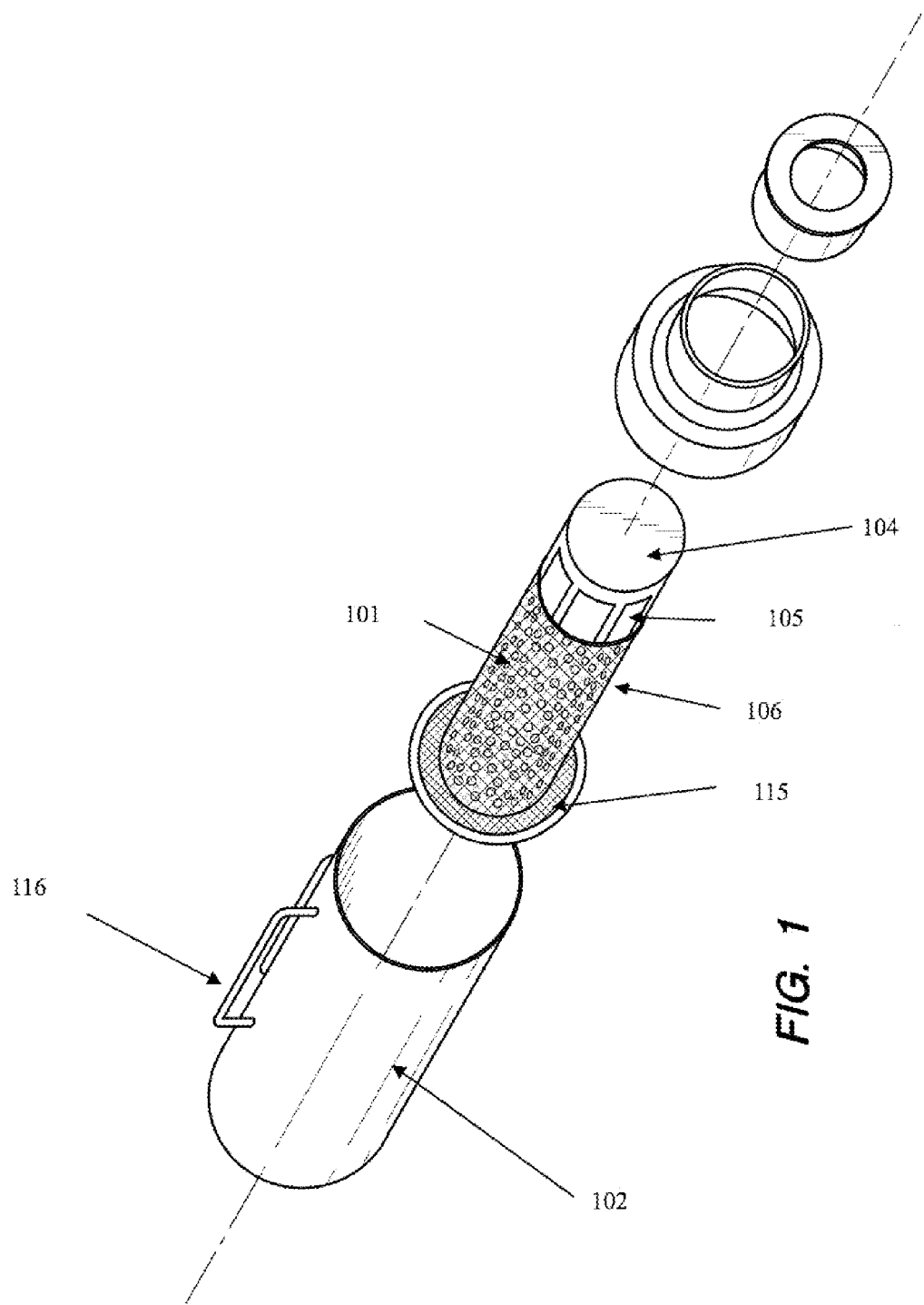
FIG. 1. Perspective view of the invention
FIG. 2. Side view of the invention
Figures 2A, 2B:
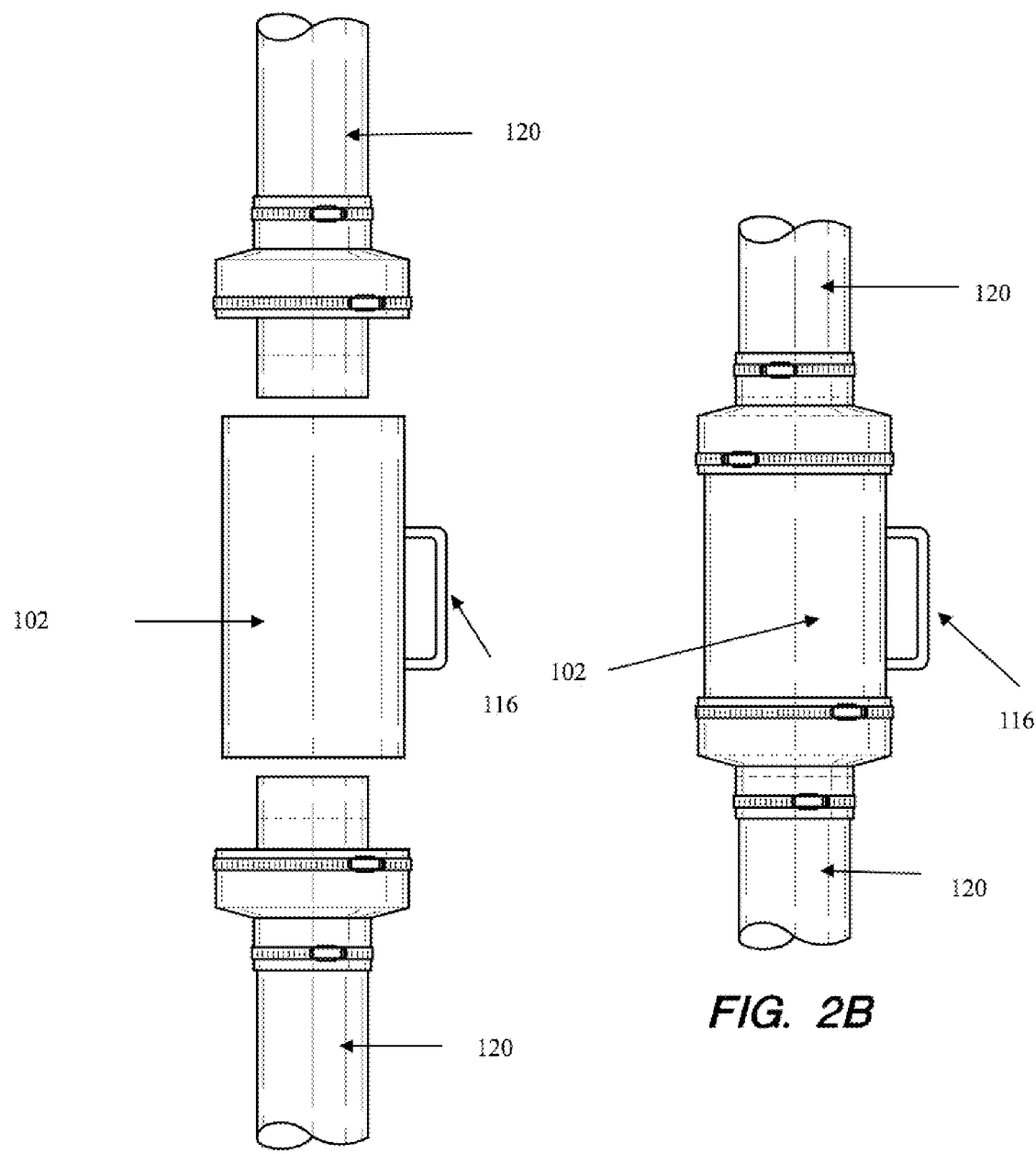

The invention 100 is comprised of an inner tube 101, an outer tube 102, an interspace 103 between the two tubes, a cap 104 placed on top of the inner tube, and a safety bypass 105. The outer tube 102 is a solid cylinder comprised of metal, ceramic, or plastic and is impervious to liquids. In the preferred embodiment, the outer tube possesses handles 116 to facilitate installation in an inline fluid conduit 120. The inner tube 101 is a cylindrical screen with a diameter smaller than the outer tube 102 comprised of a rigid material, the screen possessing holes through it of various diameters.

The holes at the top of the inner tube 101 are of significantly larger diameter than the holes at the bottom of the inner tube 101. The inner tube 101 is optionally wrapped with finer-mesh screens and/or filter material 106, in order to capture and retain particulate matter suspended in fluid passing from the area between the inner tube 101 and outer tube 102 to the interior of the inner tube 101.

The present invention 100 provides full treatment of influent fluids, at rated flows. The invention 100 will retain all debris, sediments and hydrocarbons entering it at specified flow rate, holding them in the space between the outer tube 102 and the inner tube 101.

In the preferred embodiment of the invention 100, the outer tube 102 is comprised of Powder Coated Steel and the inner tube 101 is comprised of stainless steel.

In the preferred embodiment, the inner tube 101 is fitted at its base with an absorbent filter media boom 115 for removal of petroleum hydrocarbons from influent, and the boom 115 is placed in the invention 100 to treat influent at rated flow. The absorbent media boom 115 is replaceable.

The invention 100 is designed so that it does not inhibit fluid flows entering the fluid piping, or obstruct flow through the pipe during peak fluid flows. Fluid will not bypass the finer-mesh screens and/or filter material 106 or the absorbent media boom 115 at rated flows. The filter is designed with a safety bypass 105 in the center of the unit, to which the fluid flow will be diverted during high flow conditions. The invention 100 is designed to capture high levels of hydrocarbons, grease and oil and will treat at a Flow Rate of between 0.1 gallons per minute (gpm) to 100 cubic feet per second (cfs).

The apparatus and methods described are the preferred and alternate embodiments of this invention, but other methods are possible and are within the contemplation of this patent.

What is claimed is:

1. an inline fluids filter, the filter comprised of
an inner tube, an outer tube, an interspace between the inner tube and the outer tube, and a filter means,
the outer tube a solid cylinder impervious to liquids,
the inner tube a cylindrical screen with a diameter smaller than the outer tube comprised of a rigid material, the screen possessing a plurality of holes through it of various diameters, the inner tube possessing a top end and a bottom end, the top end of the inner cylinder a flat solid structure, the bottom end open,
the plurality of holes in the inner tube comprised of two sizes, the holes at the top of the inner cylinder large and the holes at the bottom end of the inner cylinder small, the large holes at the top of the inner cylinder comprising a safety bypass for fluids,
the filter means a fine mesh screen or filter material that is wrapped around the inner cylinder to capture and retain particulate matter suspended in fluid passing from the interspace to the interior of the inner tube, the filter means extending from the bottom of the inner tube to just below the beginning of the larger holes comprising the safety bypass,
the bottom of the interspace lined with an absorbent boom, the absorbent boom comprised of materials that absorb and retain hydrocarbons.

* * * * *